(12) United States Patent
Yoshida et al.

(10) Patent No.: US 9,843,235 B2
(45) Date of Patent: Dec. 12, 2017

(54) MOTOR

(71) Applicant: Mabuchi Motor Co., Ltd., Matsudo, Chiba (JP)

(72) Inventors: Tarou Yoshida, Matsudo (JP); Shunsuke Mashio, Matsudo (JP); Akira Ishidaira, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 0 days.

(21) Appl. No.: 15/139,023

(22) Filed: Apr. 26, 2016

(65) Prior Publication Data

US 2016/0261162 A1 Sep. 8, 2016

Related U.S. Application Data

(63) Continuation of application No. PCT/JP2014/080518, filed on Nov. 18, 2014.

(30) Foreign Application Priority Data

Dec. 27, 2013 (JP) ................................. 2013-272807

(51) Int. Cl.
*H02K 5/14* (2006.01)
*H02K 5/22* (2006.01)
*H01R 39/38* (2006.01)

(52) U.S. Cl.
CPC ............. *H02K 5/14* (2013.01); *H01R 39/38* (2013.01); *H02K 5/148* (2013.01); *H02K 5/225* (2013.01)

(58) Field of Classification Search
CPC ........... H02K 5/14; H02K 5/225; H01R 39/38
See application file for complete search history.

(56) References Cited

U.S. PATENT DOCUMENTS 4,847,528 A * 7/1989 Eguchi .................... B29C 70/84
264/135
7,109,617 B2 * 9/2006 Mizutani ............. H01R 39/383
29/596

FOREIGN PATENT DOCUMENTS

| JP | 02110974 | 5/1990 |
|---|---|---|
| JP | 10051993 | 2/1998 |
| JP | 2006094693 | 4/2006 |
| JP | 2008312435 | 4/2008 |
| JP | 2012139079 | 7/2012 |

OTHER PUBLICATIONS

PCT Application No. PCT/JP2014/080518 International Preliminary Report on Patentability dated Jun. 28, 2016, 13 pages with English translation.

(Continued)

*Primary Examiner* — Dang Le
(74) *Attorney, Agent, or Firm* — Schwabe Williamson & Wyatt, PC

(57) ABSTRACT

A motor includes a brush holder fitted into an opening portion of a cylindrical housing in which a rotor is housed, and a terminal fixed to the brush holder. The brush holder includes a holder section inserted into the opening portion of the housing, a connector section that is provided in a position protruding from an outer edge portion of the holder section in a radial direction and that is connected to an external terminal, and a linking section that links the holder section and the connector section. The terminal is fixed to the linking section.

15 Claims, 9 Drawing Sheets

(56) References Cited

OTHER PUBLICATIONS

PCT Application No. PCT/JP2014/080518 International Search Report dated Feb. 17, 2015, 6 pages with English translation.
Japanese Application No. 2013-272807 Office Action dated Aug. 4, 2015, 8 pages with English translation.

* cited by examiner

MOTOR

This application is based upon and claims the benefit of priority from the prior Japanese Patent Application No. 2013-272807, filed on Dec. 27, 2013, and International Patent Application No. PCT/JP 2014/080518, filed on Nov. 18, 2014, the entire content of each of which is incorporated herein by reference.

BACKGROUND OF THE INVENTION

1. Field of the Invention

The present invention relates to a motor.

2. Description of the Related Art

As a brush holder for housing a brush of a motor, there has been conventionally devised a type of holder that is provided integrally with a connector section in which a power feed terminal, used to feed power to the brush, is fitted. In order to fit a power feed terminal in such a brush holder, there is a method of insert-molding a power feed terminal when a resin brush holder is molded. However, insert-molding requires the process of mounting a power feed terminal on a mold before the molding process, and the number of brush holders produced in each molding process is limited.

There is also a method of fixing a power feed terminal to a brush holder through the assembly of components. For example, there has been devised a brush holder integrally formed with a feeding coupler in which a power feed terminal is fitted (see Patent Document 1). In the brush holder, a concave groove, having an opening on the side facing the yoke flange, is formed from the brush holder flange to the coupler case so that the inside of the cylindrical coupler case communicates with the inner circumference of the brush holder. A brush unit, comprising the brushes, brush springs, lead stays, and power feed terminals, is fitted in the brush holder and coupler case. The power feed terminals are positioned in and supported by the coupler case using a retainer, and one end of each lead stay is fixed to the brush holder using a screw.

Related Art Document

[Patent Document 1] Japanese Patent Application Laid-open No. 10-51993

With the brush holder stated above, however, fixing with a retainer or screwing is required in order to fit the power feed terminals therein, causing an increase of necessary parts or working processes. In addition, a space is also required for the fixing with a retainer or screwing.

SUMMARY OF THE INVENTION

The present invention has been made in view of such a situation, and a purpose thereof is to provide a technique for realizing a space-saving brush holder.

To solve the problem above, a motor of an embodiment of the present invention includes a brush holder fitted into an opening portion of a housing of a cylindrical shape in which a rotor is housed, and a terminal fixed to the brush holder. The brush holder includes a holder section inserted into the opening portion of the housing, a connector section that is provided in a position protruding from an outer edge portion of the holder section in a radial direction and that is connected to an external terminal, and a linking section that links the holder section and the connector section. The terminal is fixed to the linking section.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
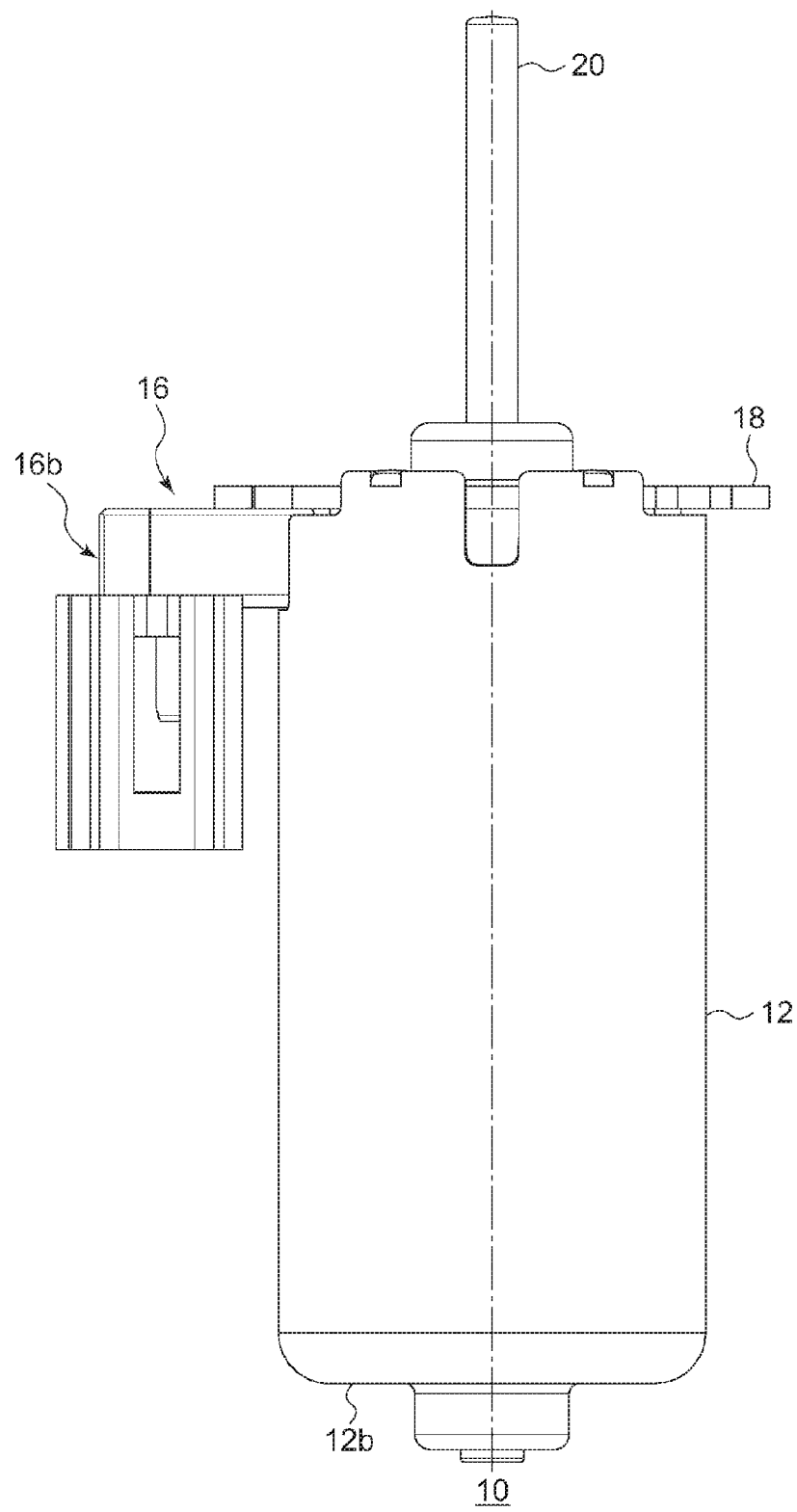
FIG. 1 is a front view of a motor according to the present embodiment.

The motor of an embodiment of the present invention includes a brush holder fitted into an opening portion of a housing of a cylindrical shape in which a rotor is housed, and a terminal fixed to the brush holder. The brush holder includes a holder section inserted into the opening portion of the housing, a connector section that is provided in a position protruding from an outer edge portion of the holder section in a radial direction and that is connected to an external terminal, and a linking section that links the holder section and the connector section. The terminal is fixed to the linking section.

According to this embodiment, the terminal can be fixed to the linking section, so that any particular processing or space is not required in the holder section and connector section, enabling the brush holder to be space-saving.

The linking section may include a through section into which a part of the terminal is inserted. The terminal may include a locking portion formed by processing a portion that protrudes from the through section when the terminal is inserted into the through section. The locking portion may be processed into a shape that cannot pass through the through section. Accordingly, a part of the terminal inserted into the through section of the linking section is not detached therefrom, so that the terminal is firmly fixed to the linking section.

The connector section may have an opening portion in which a part of the terminal is exposed, on the side to which an external terminal is connected. The opening portion may be provided on the same side as the locking portion of the terminal. Accordingly, even when a force is applied to the terminal in order to insert an external terminal into the connector section of the brush holder, for example, the locking portion is caught by the through section of the linking section, so that the terminal will not be detached from the brush holder.

The locking portion may be provided on the housing side of the brush holder. Accordingly, even when a high voltage is caused in the terminal by switching or the like, the voltage can be released to the housing via the locking portion, and the situation can be solved. As a result, a damage to a motor control device or the like susceptible to high voltage can be prevented.

The terminal may include a first terminal and a second terminal. Each of the locking portion of the first terminal and the locking portion of the second terminal may have a recess at the tip to be locked to the linking section in a state where the recess has been pushed and opened, and the recesses of the locking portion of the first terminal and the locking portion of the second terminal may be aligned in the same direction. Accordingly, the recesses of multiple terminals can be pushed and opened at a time, so that the multiple terminals can be fixed at a time.

The terminal may include a first terminal and a second terminal. The through section may include a first slit into which a part of the first terminal is press-fitted and a second slit into which a part of the second terminal is press-fitted. The linking section may include a divider part that separates a locking portion formed by processing a portion of the first terminal that protrudes from the first slit, and a locking portion formed by processing a portion of the second terminal that protrudes from the second slit. The divider part may be made of an insulating material. Accordingly, the locking portion of the first terminal and the locking portion of the second terminal can be certainly spaced apart from each other, thereby preventing a short circuit of the first terminal and the second terminal.

Another embodiment of the present invention is also a motor. The motor includes a brush holder fitted into an opening portion of a housing of a cylindrical shape in which a rotor is housed, and a first terminal and a second terminal fixed to the brush holder. The brush holder includes a holder section inserted into the opening portion of the housing, and a connector section that is provided in a position protruding from an outer edge portion of the holder section in a radial direction and that is connected to an external terminal. The first terminal and the second terminal are fixed to the holder section or the connector section, and the holder section or the connector section includes a first through section into which a part of the first terminal is inserted and a second through section into which a part of the second terminal is inserted. The first terminal includes a first locking portion formed by processing a portion that protrudes when the first terminal is inserted into the first through section. The second terminal includes a second locking portion formed by processing a portion that protrudes when the second terminal is inserted into the second through section. The first locking portion is processed into a shape that cannot pass through the first through section, the second locking portion is processed into a shape that cannot pass through the second through section, and the holder section or the connector section includes a divider part that separates the first locking portion formed by a portion of the first terminal that protrudes from the first through section and the second locking portion formed by a portion of the second terminal that protrudes from the second through section. The divider part is made of an insulating material.

According to this embodiment, the locking portion of the first terminal and the locking portion of the second terminal can be certainly spaced apart from each other, thereby preventing a short circuit of the first terminal and the second terminal.

Optional combinations of the aforementioned constituting elements, and implementations of the present invention in the form of methods, apparatuses, or systems may also be practiced as additional modes of the present invention.

In the following, an embodiment of the present invention will be described with reference to the drawings. In the drawings, like reference characters designate like or corresponding elements, and the description thereof will not be repeated for brevity. Also, the configurations described below are intended to be illustrative only and do not provide any limitation on the scope of the present invention.

Figure 2:
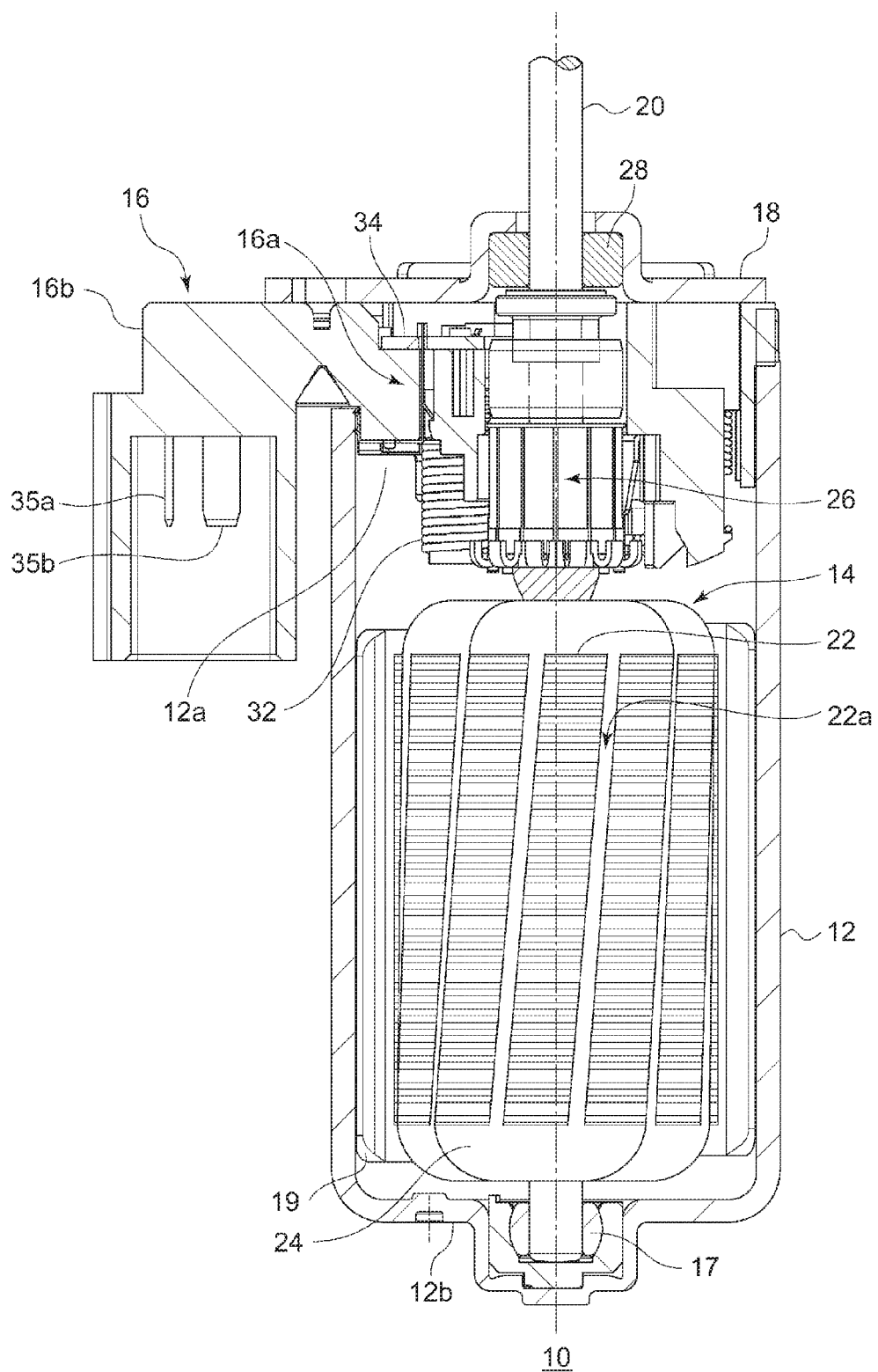
FIG. 2 is a sectional view of a motor according to the present embodiment.

FIG. 1 is a front view of a motor according to the present embodiment. FIG. 2 is a sectional view of a motor according to the present embodiment.

A DC brush motor (hereinafter, referred to as a "motor") 10 according to the present embodiment mainly comprises a housing 12 as a yoke housing, a rotor 14, a brush holder 16 with a connector, and an end plate 18 as a metallic cover member. The housing 12 has an opening portion 12a at one end and also has a bottom portion 12b, which is closed, at the other end. The bottom portion 12b is provided with a recess, in which a bearing 17 is placed. Also, on the inner wall of the housing 12, a magnet 19 of an arc shape is provided.

The rotor 14 includes a shaft 20, a core 22, a winding 24, and a commutator 26. The shaft 20 is a rotational shaft that is rotatably supported by the housing 12 and the end plate 18, via the bearing 17 and a bearing 28. The shaft 20 also functions as an output shaft. The bearing 28 is placed within a recess formed in the center portion of the end plate 18. The core 22 is formed by multiple laminated steel plates, and the shaft 20 penetrates the center of the core 22 to be fixed. The winding 24 is wound in slots 22a of the core 22 and generates magnetic force when a current flows therein.

The commutator 26 is fixed to the shaft 20, similarly to the core 22. The commutator 26 is a contact point for supplying a current provided via a brush (see FIG. 3, which will be mentioned later) in contact therewith, to the winding 24 at appropriate timing. The brush may be a carbon brush made primarily of graphite or the like, for example. Also, the brush may be a forked metal brush made primarily of noble metal or the like.

The brush holder 16 is fitted into the opening portion 12a of the cylindrical housing 12, which houses the rotor 14, and provided with a power feed path to the rotor 14 via a brush. On the power feed path, there is provided a circuit substrate 34 on which noise suppression elements including a choke coil 32, a condenser, and a varistor are mounted, and wires that connect such elements to each other are formed on a surface of the circuit substrate 34.

The brush holder 16 includes a holder section 16a of a circular shape, which corresponds to the shape of the opening portion 12a of the housing 12, and a connector section 16b that is provided in a position protruding from an outer edge portion of the holder section 16a in a radial direction and that is connected to a power feed terminal to which a current is supplied from an external power supply. Within the connector section 16b, terminals (input terminals) 35a and 35b are provided.

Figure 3:
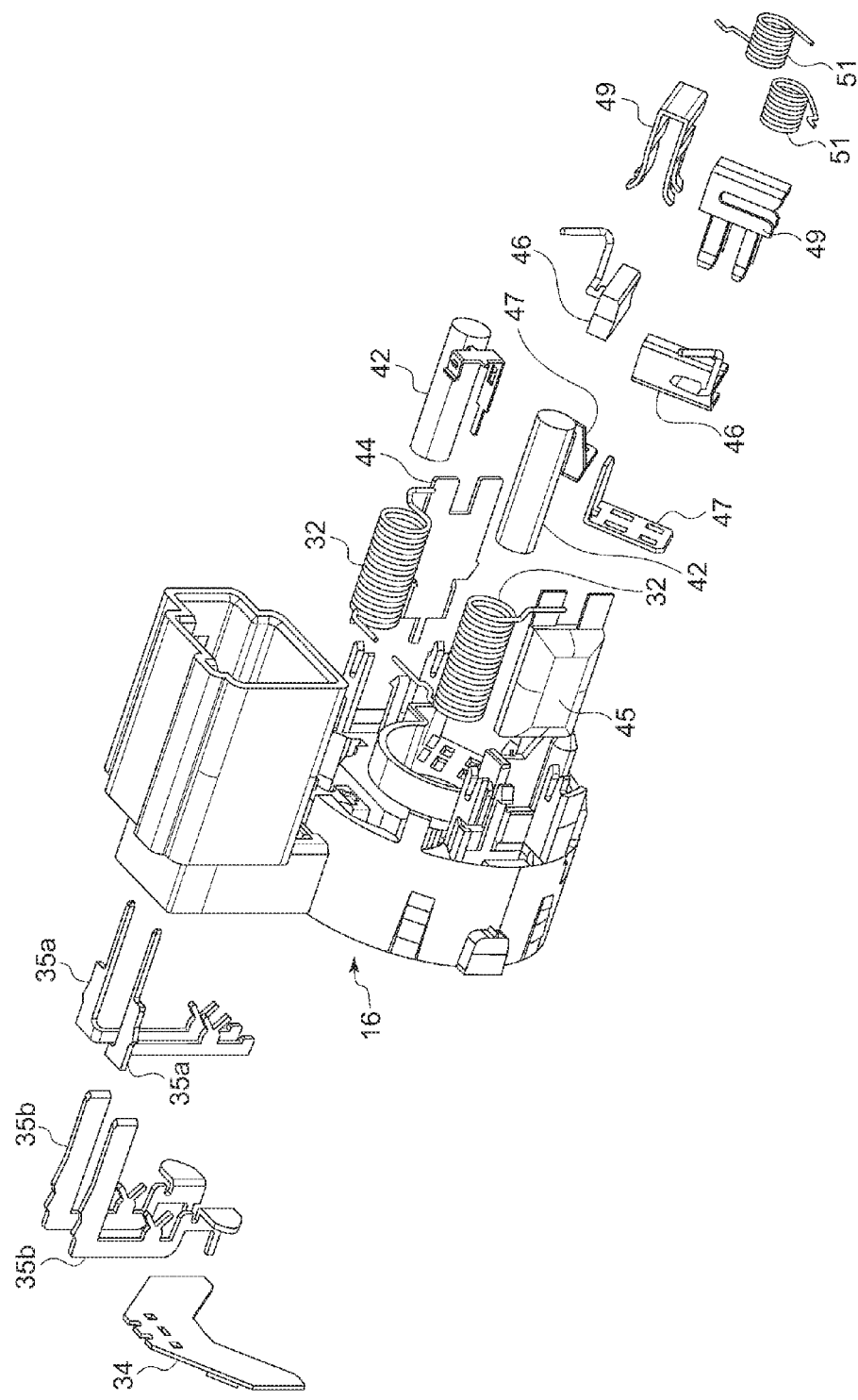
FIG. 3 is an exploded perspective view of a brush holder and components thereof.

FIG. 3 is an exploded perspective view of the brush holder and components thereof. In the brush holder 16 are fitted a pair of choke coils 32, the circuit substrate 34, a pair of ferrite cores 42, a relay terminal 44, a circuit breaker 45, a pair of brushes 46, a pair of L-shaped plates 47 on which the brushes 46 are placed, a pair of housing units 49 that are fitted to the L-shaped plates 47 and slidably house the brushes 46, springs 51 that bias the brushes 46 housed in the housing units 49 in a radial direction, a pair of current input terminals 35a used to input a current, and a pair of signal output terminals 35b used to output a signal from a Hall IC or the like mounted on the circuit substrate 34.

Figure 4:
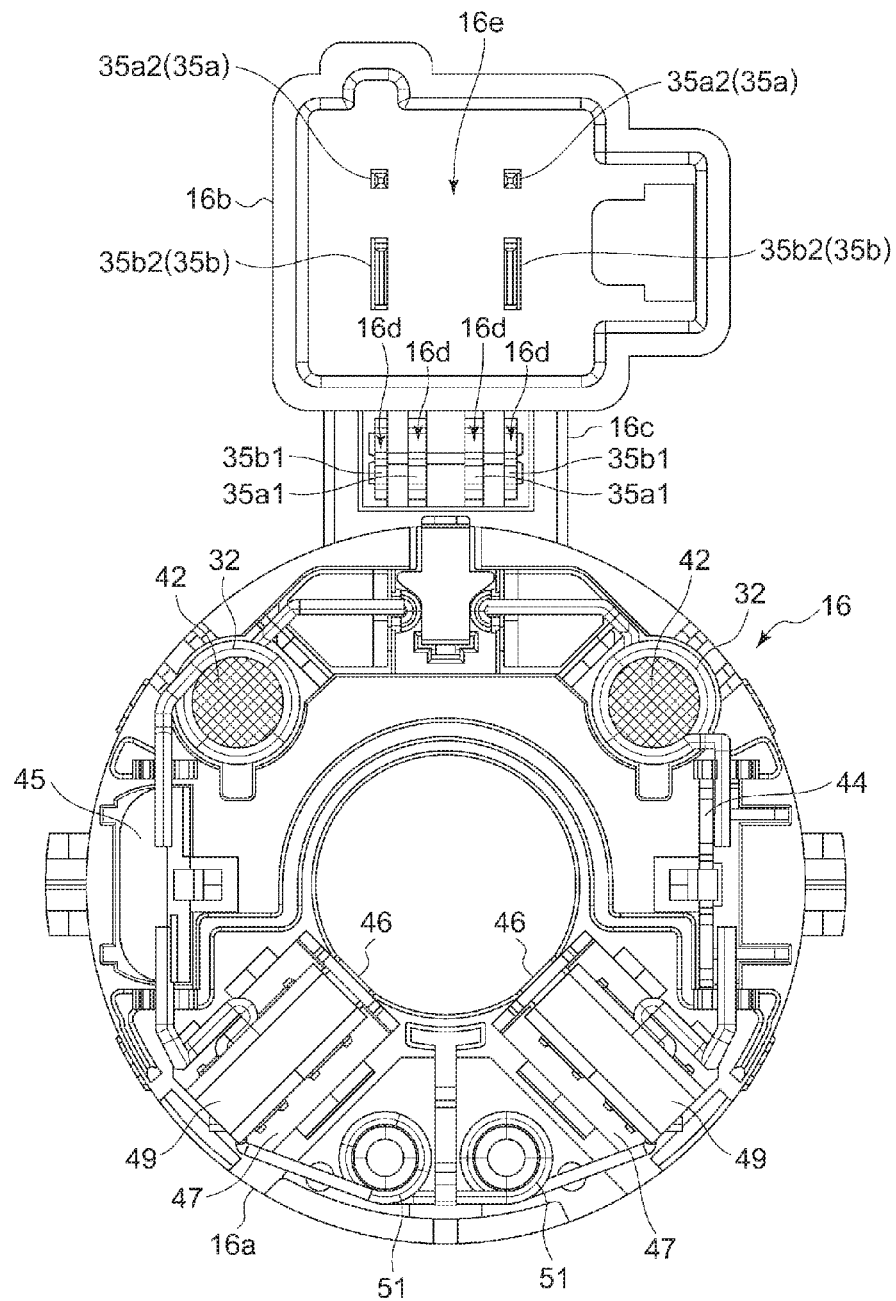
FIG. 4 is a front view of the brush holder shown in FIG. 3 viewed from the housing side, in the state where the components are set in place.
Figure 5:
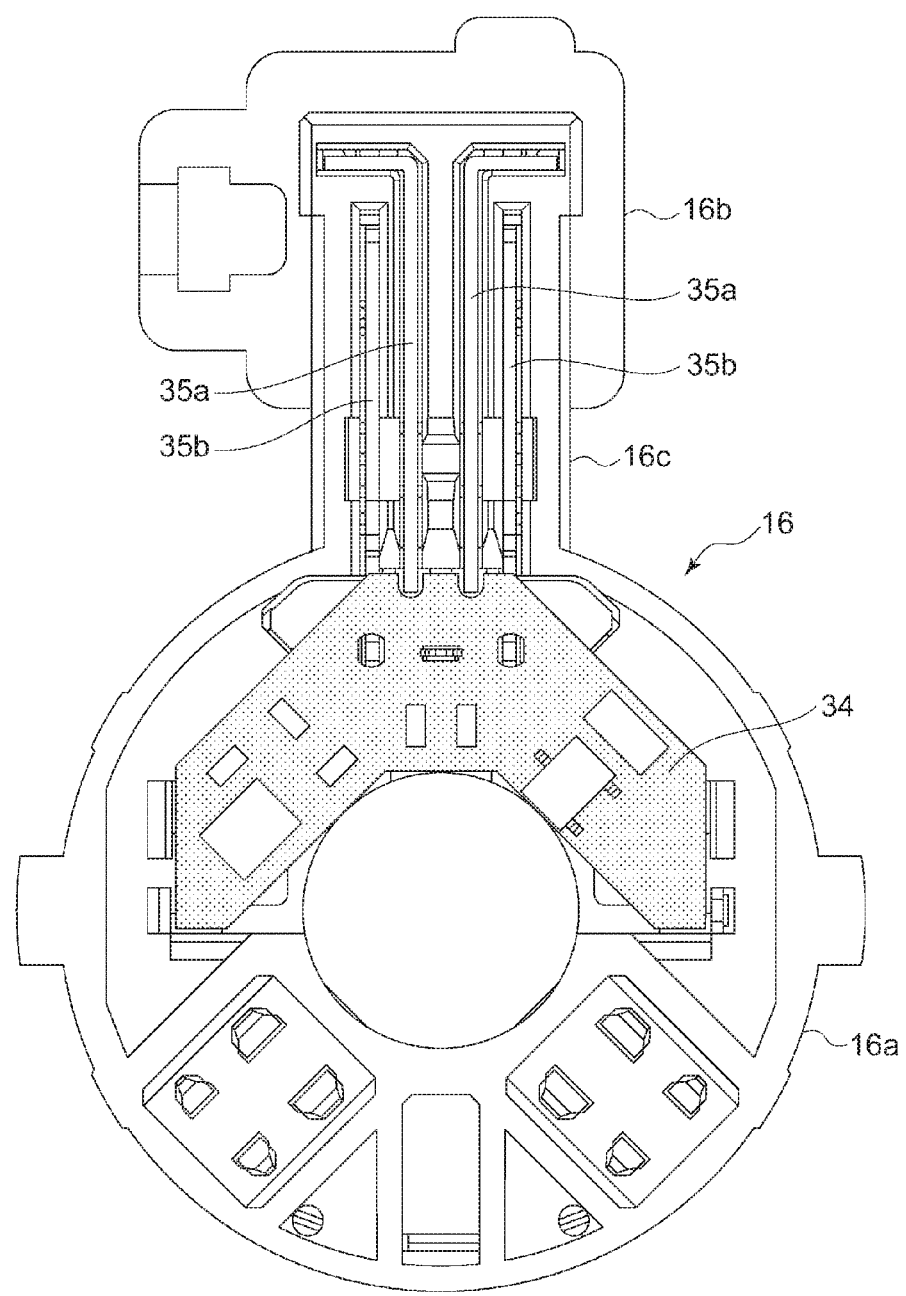
FIG. 5 is a front view of the brush holder shown in FIG. 3 viewed from the circuit substrate side, in the state where the components are set in place.

FIG. 4 is a front view of the brush holder 16 shown in FIG. 3 viewed from the housing side, in the state where the components are set in place. FIG. 5 is a front view of the brush holder 16 shown in FIG. 3 viewed from the circuit substrate 34 side, in the state where the components are set in place.

The pair of terminals 35a are fixed to the brush holder 16 as power feed paths to the rotor 14. Also, the pair of terminals 35b are fixed to the brush holder 16 as paths of output signals from elements mounted on the circuit substrate 34. The brush holder 16 includes the holder section 16a inserted into the opening portion 12a of the housing 12, the connector section 16b that is provided in a position protruding from an outer edge portion of the holder section 16a in a radial direction and that is connected to an external terminal, and a linking section 16c that links the holder section 16a and connector section 16b. The terminals are fixed to the linking section 16c.

Thus, the terminals 35a and terminals 35b can be fixed to the linking section 16c, so that any particular processing or space is not required in the holder section 16a and connector section 16b, enabling the brush holder 16 to be space-saving.

The linking section 16c includes slit holes 16d as through sections into which parts of the terminals 35a and 35b are inserted (see FIG. 4). The terminals 35a and 35b may be provided with locking portions 35a1 and 35b1, which are formed by processing portions that protrude from the slit holes 16d when the terminals 35a and 35b are inserted into the slit holes 16d. Each of the locking portions 35a1 and 35b1 is processed into a shape that cannot pass through a slit hole 16d. More specifically, each of the locking portions 35a1 and 35b1 has a U-shaped or Y-shaped wider part of which the tips have a distance therebetween longer than the length of a slit hole 16d. Accordingly, parts of the terminals 35a and 35b inserted into the slit holes 16d of the linking section 16c are not detached therefrom, so that the terminals 35a and 35b are firmly fixed to the linking section 16c.

The connector section 16b has an opening portion 16e in which external terminal connection portions 35a2 and 35b2 of the terminals are exposed, on the side to which external terminals are connected. The opening portion 16e is provided on the same side as the locking portions 35a1 and 35b1 of the terminals 35a and 35b. Therefore, even when a force is applied to the terminals 35a and 35b in order to insert an external terminal into the connector section 16b of the brush holder 16, the locking portions 35a1 and 35b1 are caught by the slit holes 16d of the linking section 16c, so that the terminals 35a and 35b will not be detached from the brush holder 16.

Also, the locking portions 35a1 and 35b1 are provided on the housing side of the brush holder 16. Accordingly, even when a high voltage is caused in the terminals 35a and 35b by switching or the like, the voltage can be released to the housing 12 via the locking portions 35a1 and 35b1, and the situation can be solved. As a result, a damage to a motor control device or the like susceptible to high voltage can be prevented.

Figure 6A:
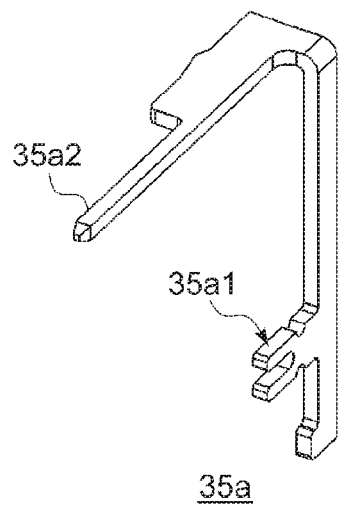
FIG. 6A is a perspective view of a current input terminal viewed from one angle.
Figure 6B:
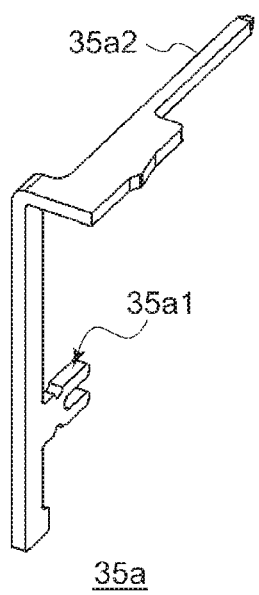
FIG. 6B is a perspective view of the current input terminal viewed from another angle.
Figure 6C:
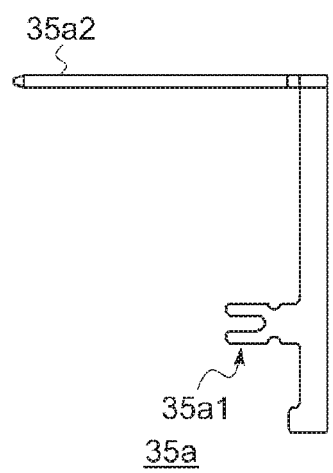
FIG. 6C is a side view of the current input terminal.
Figure 7A:
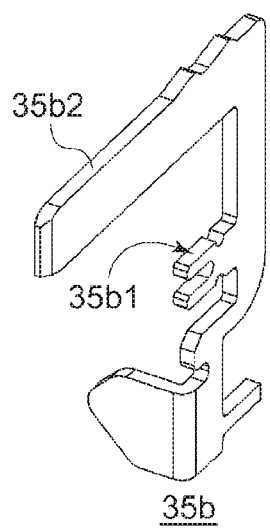
FIG. 7A is a perspective view of a signal output terminal viewed from one angle.
Figure 7B:
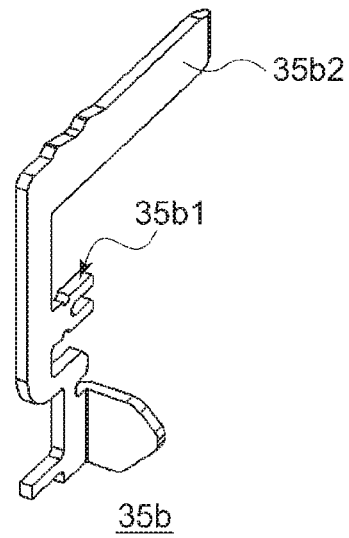
FIG. 7B is a perspective view of the signal output terminal viewed from another angle.
Figure 7C:
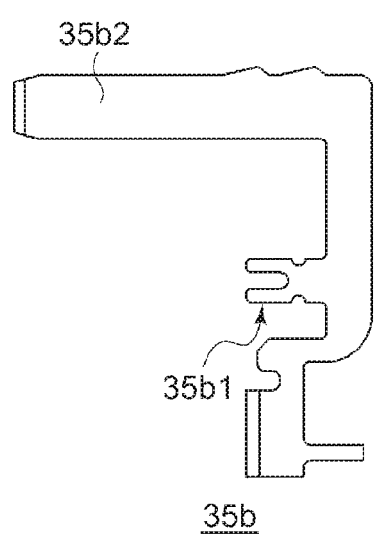
FIG. 7C is a side view of the signal output terminal.

FIG. 6A is a perspective view of a current input terminal 35a viewed from one angle, FIG. 6B is a perspective view of the current input terminal 35a viewed from another angle, and FIG. 6C is a side view of the current input terminal 35a. FIG. 7A is a perspective view of a signal output terminal 35b viewed from one angle, FIG. 7B is a perspective view of the signal output terminal 35b viewed from another angle, and FIG. 7C is a side view of the signal output terminal 35b. Each of the terminals 35a and 35b is formed by stamping a plate member into a predetermined shape and performing a bending process thereon.

Figure 8A:
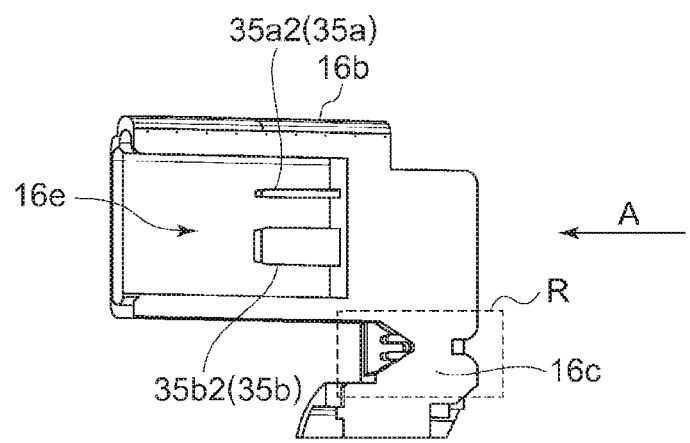
FIG. 8A is a schematic diagram that shows a sectional view near a connector section and a linking section.
Figure 8B:
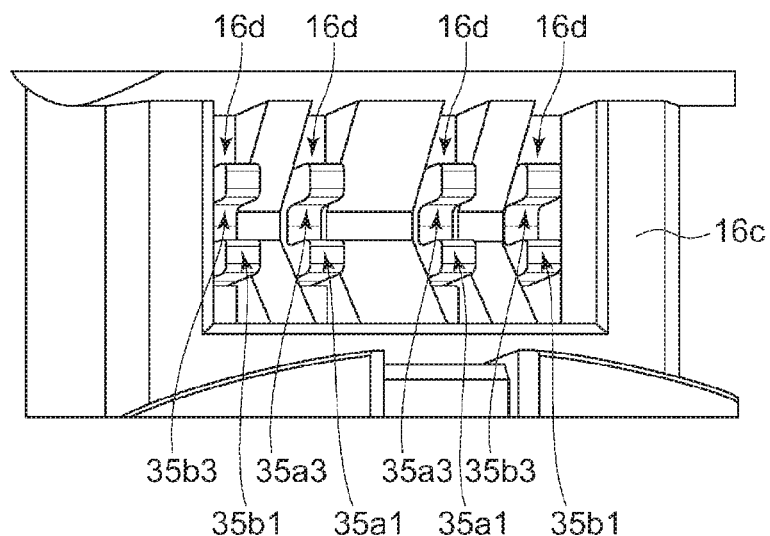
FIG. 8B is a perspective view of the linking section viewed from the front side.
Figure 8C:
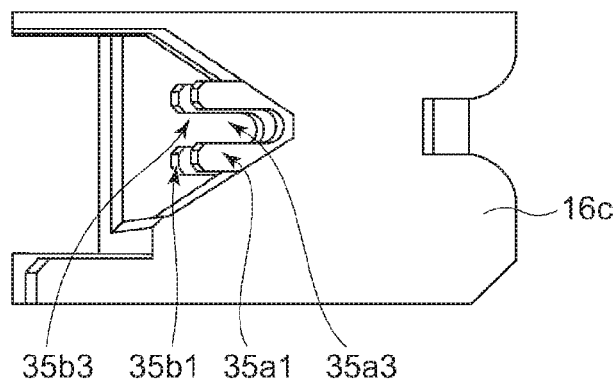
FIG. 8C is a magnified view of the region R shown in FIG. 8A.
Figure 9A:
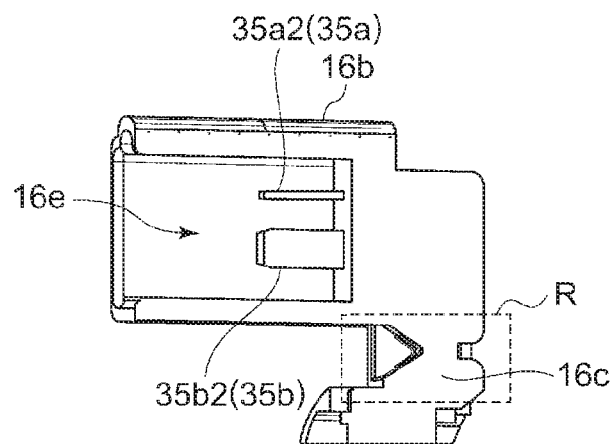
FIG. 9A is a schematic diagram that shows a sectional view near the connector section 16b and linking section 16c after the terminals are fixed.
Figure 9B:
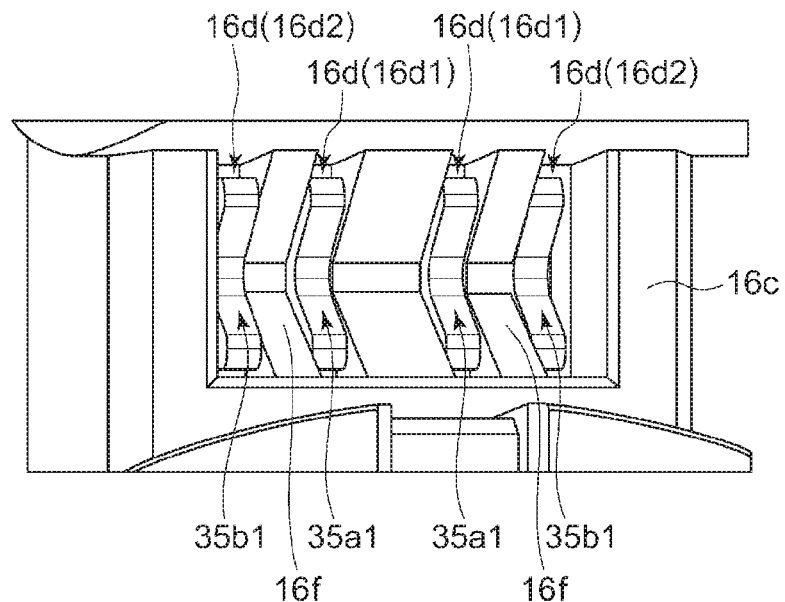
FIG. 9B is a perspective view of the linking section 16c after the terminals are fixed, viewed from the front side.
Figure 9C:
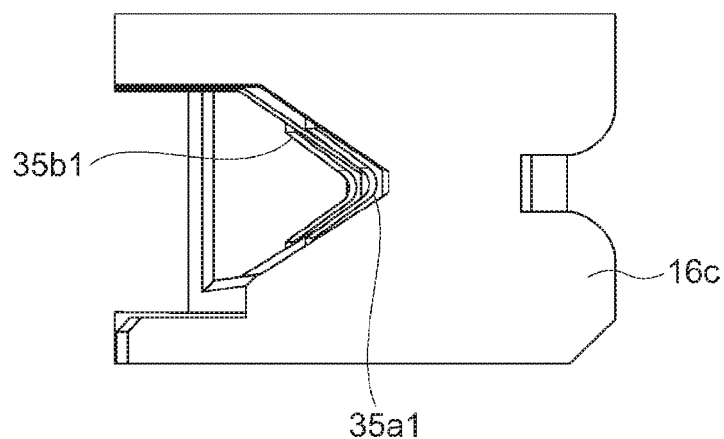
FIG. 9C is a magnified view of the region R shown in FIG. 9A.

There will now be described a method for fixing each terminal to the linking section 16c. FIG. 8A is a schematic diagram that shows a sectional view near the connector section 16b and the linking section 16c, FIG. 8B is a perspective view of the linking section 16c viewed from the front side, and FIG. 8C is a magnified view of the region R shown in FIG. 8A. FIG. 9A is a schematic diagram that shows a sectional view near the connector section 16b and the linking section 16c after the terminals are fixed, FIG. 9B is a perspective view of the linking section 16c after the terminals are fixed, viewed from the front side, and FIG. 9C is a magnified view of the region R shown in FIG. 9A.

First, as shown in FIG. 8A, the terminals 35a and 35b are inserted (press-fitted) from the back side of the connector section 16b and linking section 16c in the direction of the arrow A, into the respective through sections. At the time, the terminals are positioned in the state where the locking portions 35a1 and 35b1 are protruding from the respective slit holes 16d formed in the linking section 16c.

The terminals according to the present embodiment include a pair of current input terminals 35a and a pair of signal output terminals 35b. The locking portion 35a1 of a terminal 35a has a recess 35a3 at the tip, and the locking portion 35b1 of a terminal 35b has a recess 35b3 at the tip. The recesses 35a3 of the locking portions 35a1 of the terminals 35a and the recesses 35b3 of the locking portions 35b1 of the terminals 35b are aligned in the same direction.

In this state, when a jig of a predetermined shape is pressed on the front side of the locking portions 35a1 and 35b1 protruding from the linking section 16c so as to push and open the recesses 35a3 and 35b3, the locking portions 35a1 and 35b1 are locked to the linking section 16c, so that the terminals 35a and 35b are fixed to the linking section 16c. Since the recesses 35a3 and 35b3 of the multiple terminals 35a and 35b can be pushed and opened at a time, the multiple terminals 35a and 35b can be fixed at a time (see FIGS. 9A-9C).

The through sections according to the present embodiment include slit holes 16d1 into which parts of the terminals 35a are press-fitted, and slit holes 16d2 into which parts of the terminals 35b are press-fitted. The linking section 16c includes divider parts 16f that each separate a locking portion 35a1 formed by processing a portion of a terminal 35a that protrudes from a slit hole 16d1, and a locking portion 35b1 formed by processing a portion of a terminal 35b that protrudes from a slit hole 16d2. The divider parts 16f are made of an insulating material, such as a resin. Accordingly, a locking portion 35a1 of a terminal 35a and a locking portion 35b1 of a terminal 35b can be certainly spaced apart from each other, thereby preventing a short circuit of the terminal 35a and terminal 35b.

When the connector section 16b doubles as the linking section 16c, it can also be said that the motor 10 according to the present embodiment has the following configuration. The motor 10 comprises the brush holder 16 fitted into the opening portion 12a of the cylindrical housing 12 in which the rotor 14 is housed, and the terminals 35a and 35b fixed to the brush holder 16. The brush holder 16 includes the holder section 16a inserted into the opening portion 12a of the housing 12, and the connector section 16b that is provided in a position protruding from an outer edge portion of the holder section 16a in a radial direction and that is connected to an external terminal. The terminals 35a and 35b are fixed to the holder section 16a and the connector section 16b.

The holder section 16a or the connector section 16b has the slit holes 16d1 into which parts of the terminals 35a are inserted, and the slit holes 16d2 into which parts of the terminals 35b are inserted. The terminals 35a are provided with the locking portions 35a1 formed by processing portions that protrude from the slit holes 16d1 when the terminals 35a are inserted into the slit holes 16d1. Also, the terminals 35b are provided with the locking portions 35b1 formed by processing portions that protrude from the slit holes 16d2 when the terminals 35b are inserted into the slit holes 16d2. The locking portions 35a1 are processed into a shape that cannot pass through the slit holes 16d1, and the locking portions 35b1 are processed into a shape (size) that cannot pass through the slit holes 16d2. The holder section 16a or the connector section 16b includes the divider parts 16f that each separate a locking portion 35a1 formed by a portion of a terminal 35a that protrudes from a slit hole 16d1, and a locking portion 35b1 formed by a portion of a terminal 35b that protrudes from a slit hole 16d2. Accordingly, a locking portion 35a1 of a terminal 35a and a locking portion 35b1 of a terminal 35b can be certainly spaced apart from each other, thereby preventing a short circuit of the terminal 35a and terminal 35b.

The present invention has been described with reference to the aforementioned embodiment. However, the present invention is not limited thereto and also includes a form resulting from appropriate combination or replacement of the configurations in the embodiment. It is also to be understood that appropriate changes of the combination or the order of processes in the embodiment or various modifications, including design modifications, may be made based on the knowledge of those skilled in the art and that such changes and modifications also fall within the scope of the present invention.

The invention claimed is:

1. A motor, comprising:
a brush holder fitted into an opening portion of a housing of a cylindrical shape in which a rotor is housed; and
a terminal fixed to the brush holder, wherein
the brush holder includes:
  a holder section inserted into the opening portion of the housing;
  a connector section that is provided in a position protruding from an outer edge portion of the holder section in a radial direction and that is connected to an external terminal; and
  a linking section that links the holder section and the connector section, the linking section includes a through section into which a part of the terminal is inserted, and wherein
the terminal is fixed to the linking section and includes a locking portion formed by processing a portion that protrudes from the through section when the terminal is inserted into the through section,
the locking portion is processed into a shape that cannot pass through the through section, and
the holder section, the connector section, and the linking section form an integrally formed resin component.

2. The motor of claim 1, wherein:
the connector section has an opening portion in which a part of the terminal is exposed, on the side to which an external terminal is connected; and
the opening portion is provided on the same side as the locking portion of the terminal.

3. The motor of claim 2, wherein the locking portion is provided on the housing side of the brush holder.

4. The motor of claim 2, wherein:
the terminal includes a first terminal and a second terminal;
each of the locking portion of the first terminal and the locking portion of the second terminal has a recess at the tip and is locked to the linking section in a state where the recess has been pushed and opened; and
the recesses of the locking portion of the first terminal and the locking portion of the second terminal are aligned in the same direction.

5. The motor of claim 2, wherein:
the terminal includes a first terminal and a second terminal;
the through section includes a first slit into which a part of the first terminal is press-fitted and a second slit into which a part of the second terminal is press-fitted;
the linking section includes a divider part that separates a locking portion formed by processing a portion of the first terminal that protrudes from the first slit, and a locking portion formed by processing a portion of the second terminal that protrudes from the second slit; and
the divider part is made of an insulating material.

6. The motor of claim 1, wherein the locking portion is provided on the housing side of the brush holder.

7. The motor of claim 6, wherein:
the terminal includes a first terminal and a second terminal;
each of the locking portion of the first terminal and the locking portion of the second terminal has a recess at the tip and is locked to the linking section in a state where the recess has been pushed and opened; and
the recesses of the locking portion of the first terminal and the locking portion of the second terminal are aligned in the same direction.

8. The motor of claim 6, wherein:
the terminal includes a first terminal and a second terminal;
the through section includes a first slit into which a part of the first terminal is press-fitted and a second slit into which a part of the second terminal is press-fitted;
the linking section includes a divider part that separates a locking portion formed by processing a portion of the first terminal that protrudes from the first slit, and a locking portion formed by processing a portion of the second terminal that protrudes from the second slit; and
the divider part is made of an insulating material.

9. The motor of claim 1, wherein:
the terminal includes a first terminal and a second terminal;
each of the locking portion of the first terminal and the locking portion of the second terminal has a recess at the tip and is locked to the linking section in a state where the recess has been pushed and opened; and the recesses of the locking portion of the first terminal and the locking portion of the second terminal are aligned in the same direction.

10. The motor of claim 9, wherein:
the terminal includes a first terminal and a second terminal;
the through section includes a first slit into which a part of the first terminal is press-fitted and a second slit into which a part of the second terminal is press-fitted;
the linking section includes a divider part that separates a locking portion formed by processing a portion of the first terminal that protrudes from the first slit, and a locking portion formed by processing a portion of the second terminal that protrudes from the second slit; and
the divider part is made of an insulating material.

11. The motor of claim 1, wherein:
the terminal includes a first terminal and a second terminal;
the through section includes a first slit into which a part of the first terminal is press-fitted and a second slit into which a part of the second terminal is press-fitted;
the linking section includes a divider part that separates a locking portion formed by processing a portion of the first terminal that protrudes from the first slit, and a locking portion formed by processing a portion of the second terminal that protrudes from the second slit; and
the divider part is made of an insulating material.

12. A motor, comprising:
a brush holder fitted into an opening portion of a housing of a cylindrical shape in which a rotor is housed; and
a first terminal and a second terminal that are fixed to the brush holder, wherein the brush holder includes:
a holder section inserted into the opening portion of the housing; and
a connector section that is provided in a position protruding from an outer edge portion of the holder section in a radial direction and that is connected to an external terminal, and wherein:
the first terminal and the second terminal are fixed to the holder section or the connector section;
the holder section or the connector section includes a first through section into which a part of the first terminal is inserted, and a second through section into which a part of the second terminal is inserted;
the first terminal includes a first locking portion formed by processing a portion that protrudes when the first terminal is inserted into the first through section;
the second terminal includes a second locking portion formed by processing a portion that protrudes when the second terminal is inserted into the second through section;
the first locking portion is processed into a shape that cannot pass through the first through section;
the second locking portion is processed into a shape that cannot pass through the second through section;
the holder section or the connector section includes a divider part that separates the first locking portion formed by a portion of the first terminal that protrudes from the first through section, and the second locking portion formed by a portion of the second terminal that protrudes from the second through section; and
the divider part is made of an insulating material.

13. The motor according to claim 12, wherein
the holder section and the connector section form an integrally formed resin component.

14. A motor, comprising:
a brush holder fitted into an opening portion of a housing of a cylindrical shape in which a rotor is housed; and
a terminal fixed to the brush holder, wherein the brush holder includes:
a holder section inserted into the opening portion of the housing;
a connector section that is provided in a position protruding from an outer edge portion of the holder section in a radial direction and that is connected to an external terminal; and
a linking section that links the holder section and the connector section, and wherein
the terminal is fixed to the linking section;
the linking section includes a through section into which a part of the terminal is inserted;
the terminal includes a locking portion formed by processing a portion that protrudes from the through section when the terminal is inserted into the through section; and
the locking portion is processed into a shape that cannot pass through the through section.

15. The motor of claim 14, wherein:
the terminal includes a first terminal and a second terminal;
each of the locking portion of the first terminal and the locking portion of the second terminal has a recess at the tip and is locked to the linking section in a state where the recess has been pushed and opened; and
the recesses of the locking portion of the first terminal and the locking portion of the second terminal are aligned in the same direction.

* * * * *